(12) United States Patent
Sriraman et al.

(10) Patent No.: US 8,908,129 B2
(45) Date of Patent: Dec. 9, 2014

(54) REFLECTIVE POLYMERIC ARTICLE AND MANUFACTURE

(75) Inventors: Ravi Sriraman, Pune (IN); Chinniah Thiagarajan, Karnataka (IN); Ajay Taraiya, Bangalore (IN)

(73) Assignee: Sabic Global Technologies B.V. (NL)

( * ) Notice: Subject to any disclaimer, the term of this patent is extended or adjusted under 35 U.S.C. 154(b) by 1032 days.

(21) Appl. No.: 12/462,943

(22) Filed: Aug. 12, 2009

(65) Prior Publication Data

US 2009/0305030 A1 Dec. 10, 2009

Related U.S. Application Data

(63) Continuation-in-part of application No. 11/965,938, filed on Dec. 28, 2007, now abandoned.

(51) Int. Cl.

| | | |
|---|---|---|
| *G02F 1/1335* | (2006.01) | |
| *B29C 65/00* | (2006.01) | |
| *B29C 44/34* | (2006.01) | |
| *C08J 9/00* | (2006.01) | |
| *C08J 9/10* | (2006.01) | |
| *B32B 3/26* | (2006.01) | |
| *B32B 3/00* | (2006.01) | |
| *B29C 44/02* | (2006.01) | |
| *B29D 11/00* | (2006.01) | |

(52) U.S. Cl.
CPC ............ *B29C 44/02* (2013.01); *B29C 44/352* (2013.01); *B29D 11/00605* (2013.01); *B29K 2995/003* (2013.01)
USPC ................ 349/113; 264/41; 264/50; 264/51; 264/54; 428/304.4; 428/314.2

(58) Field of Classification Search
USPC ........ 264/41, 50, 51, 54; 349/113; 428/304.4, 428/314.2; 521/180
See application file for complete search history.

(56) References Cited

U.S. PATENT DOCUMENTS

| | | | |
|---|---|---|---|
| 3,711,176 A | | 1/1973 | Alfrey, Jr. et al. |
| 3,883,625 A | * | 5/1975 | Thomas et al. .............. 264/45.6 |
| 4,025,687 A | | 5/1977 | Wooler et al. |
| 4,664,681 A | * | 5/1987 | Anazawa et al. ................. 96/10 |
| 4,766,036 A | * | 8/1988 | Vaughn et al. ................ 428/364 |
| 4,782,098 A | | 11/1988 | Allen et al. |
| 4,882,363 A | | 11/1989 | Neuhaus et al. |

(Continued)

FOREIGN PATENT DOCUMENTS

| | | |
|---|---|---|
| DE | 19610330 A1 | 9/1997 |
| EP | 0319866 A2 | 6/1989 |

(Continued)

OTHER PUBLICATIONS

German Patent No. 19610330A1; Publication Date: Sep. 18, 1997; Abstract Only; 1 Page.

(Continued)

*Primary Examiner* — Melissa Rioja
(74) *Attorney, Agent, or Firm* — Cantor Colburn LLP

(57) ABSTRACT

In one embodiment, the method for making a polymer article comprises: orienting polymer chains in one direction more than any other direction to form an oriented article, contacting the oriented article with a foaming agent, and foaming the material to form the reflective polymer article comprising planar cell structures having a length "l" and a thickness "t".

20 Claims, 3 Drawing Sheets

(56) References Cited

U.S. PATENT DOCUMENTS

| | | | |
|---|---|---|---|
| 5,126,880 | A | 6/1992 | Wheatley et al. |
| 5,179,130 | A | 1/1993 | Bland et al. |
| 5,254,597 | A | 10/1993 | Horn et al. |
| 5,272,182 | A | 12/1993 | Burnell |
| 5,324,461 | A | 6/1994 | Grohman |
| 5,662,293 | A | 9/1997 | Hower et al. |
| 5,676,894 | A * | 10/1997 | Specht ................ 264/46.4 |
| 6,113,822 | A | 9/2000 | Adedeji |
| 6,157,486 | A | 12/2000 | Benson, Jr. et al. |
| 6,177,153 | B1 * | 1/2001 | Uchiyama et al. ............ 428/1.1 |
| 6,403,663 | B1 | 6/2002 | DeSimone et al. |
| 6,555,589 | B1 | 4/2003 | Tan |
| 6,555,590 | B1 | 4/2003 | Tan |
| 6,593,384 | B2 | 7/2003 | Anderson et al. |
| 6,767,501 | B1 * | 7/2004 | Kirjavainen ................ 264/572 |
| 6,793,854 | B1 * | 9/2004 | Kirjavainen ................ 264/45.9 |
| 6,884,377 | B1 | 4/2005 | Burnham et al. |
| 6,884,823 | B1 | 4/2005 | Pierick et al. |
| 6,946,092 | B1 * | 9/2005 | Bertolino et al. ............ 264/512 |
| 7,171,095 | B2 | 1/2007 | Sugita et al. |
| 2002/0168509 | A1 * | 11/2002 | DeSimone et al. ........ 428/310.5 |
| 2003/0105176 | A1 | 6/2003 | Haas et al. |
| 2003/0203156 | A1 * | 10/2003 | Hiraishi et al. ................ 428/131 |
| 2003/0205832 | A1 | 11/2003 | Lee et al. |
| 2004/0082276 | A1 | 4/2004 | Prasad |
| 2004/0198853 | A1 | 10/2004 | Saito et al. |
| 2005/0191464 | A1 | 9/2005 | Takahashi et al. |
| 2005/0207002 | A1 | 9/2005 | Liu et al. |
| 2006/0127663 | A1 | 6/2006 | Strey et al. |
| 2006/0257594 | A1 | 11/2006 | Haas et al. |
| 2007/0045888 | A1 | 3/2007 | Lee et al. |
| 2007/0108465 | A1 | 5/2007 | Pacholski et al. |
| 2009/0130420 | A1 | 5/2009 | Thiagarajan et al. |
| 2009/0148665 | A1 | 6/2009 | Thiagarajan et al. |
| 2009/0168176 | A1 | 7/2009 | Sriraman et al. |
| 2009/0247654 | A1 | 10/2009 | Rajendran et al. |
| 2009/0269672 | A1 * | 10/2009 | Takita et al. ................ 429/254 |
| 2010/0326994 | A1 * | 12/2010 | Ichikawa et al. ............ 220/675 |

FOREIGN PATENT DOCUMENTS

| | | |
|---|---|---|
| EP | 0545175 A2 | 6/1993 |
| EP | 1424124 A1 | 6/2004 |
| EP | 1296810 B1 | 9/2004 |
| GB | 1196128 A | 6/1970 |
| GB | 1562616 A | 3/1980 |
| JP | 200555883 A | 3/2005 |
| JP | 2007261071 A | 10/2007 |
| WO | 9634039 A1 | 10/1996 |
| WO | 0018557 | 4/2000 |
| WO | 0241987 A2 | 5/2002 |
| WO | 2005092959 A1 | 10/2005 |
| WO | 2007142260 A1 | 12/2007 |

OTHER PUBLICATIONS

International Publication No. 2005/092959 A1; International Publication Date: Oct. 6, 2005; Abstract Only; 1 Page.

Adhikari, Avishek, "A New Visual Cryptographic Scheme Using Latin Squares", IEICE Trans. Fundamentals, vol. E87-A. No. 5, Document No. XP-01196128, pp. 1198-1202, dated May 2004.

Database WPI Week 199049, Thomson Scientific, London, GB; AN 1990-364544, 2 pages.

International Search Report; International Application No. PCT/IB2008/000757; International Filing Date: Jan. 17, 2008; Date of Mailing: Apr. 6, 2009; 6 Pages.

Written Opinion of the International Searching Authority; International Application No. PCT/IB2008/000757; International Filing Date: Jan. 17, 2008; Date of Mailing: Apr. 6, 2009; 7 Pages.

International Search Report; International Application No. PCT/IB2008/052517; International Filing Date: Jun. 24, 2008; Date of Mailing: Oct. 31, 2008; 7 Pages.

Written Opinion of the International Searching Authority; International Application No. PCT/IB2008/052517; International Filing Date: Jun. 24, 2008; date of Mailing: Oct. 31, 2008; 7 Pages.

International Search Report; International Application No. PCT/IB2008/051209; International Filing Date: Mar. 23, 2009; Date of Mailing: Aug. 5, 2009; 6 Pages.

Written Opinion of the International Searching Authority; International Application No. PCT/IB2008/051209; International Filing Date: Mar. 23, 2009; Date of Mailing: Aug. 5, 2009; 7 Pages.

U.S. Appl. No. 11/623,910, filed Jan. 17, 2007.

Wang, Zhonggang et al., "Hydrogen-Bonding in Cardo Copoly(aryl ether keton)s and Its Effects on the Gas Permeation Behavior" Document No. XP-002499699, Macromolecules 2007, 40, pp. 3238-3245, (c) 2007 American Chemical Society, Published on the Web Apr. 3, 2007.

Japanese Patent No. 2005055883 (A); Publication Date: Mar. 3, 2005; Abstract Only; 1 Page.

International Publication No. 2007142260 (A1); Publication Date: Dec. 13, 2007; Abstract Only; 1 Page.

Japanese Patent No. 2007261071 (A); Publication Date: Oct. 11, 2007; Abstract Only; 1 Page.

International Search Report; International Application No. PCT/IB2008/055216; International Filing Date: Dec. 10, 2008; Date of Mailing: Oct. 21, 2009; 7 Pages.

Written Opinion of the International Searching Authority; International Application No. PCT/IB2008/055216; International Filing Date: Dec. 10, 2008; Date of Mailing: Oct. 21, 2009; 8 Pages.

\* cited by examiner

REFLECTIVE POLYMERIC ARTICLE AND MANUFACTURE

CROSS-REFERENCE TO RELATED APPLICATION

This application is a continuation-in-part application of U.S. patent Ser. No. 11/965,938, filed Dec. 28, 2007.

BACKGROUND

This application is related to foamed polymeric articles. More particularly this application is related to foamed polymeric articles containing multiple layers of polymer gas interfaces.

Generally, plastic films are dyed or pigmented to provide the desired color or optical characteristics. To make mirror like reflective surfaces, the plastic films are conventionally metallized by several known techniques such as a vacuum deposition method. However, the material and process involved are both expensive and time consuming.

Stacked layers of material in the order of the wavelengths of visible light (about 500 nanometers (nm)) are known to show high reflective properties due to light wave interference and the difference in refractive index between the layers, the air, and the material.

Highly reflective colored plastic film can be prepared by the coextrusion technique from a transparent plastic having no pigment or inorganic material. The process shows forming a film from a number of layers of different thermoplastic materials, which differ in refractive index and the layer thicknesses from about 0.05 micrometers to about one micrometers.

The fabrication process to produce a uniform stack of very thin polymeric films requires good control on thickness of the layers, which is difficult. In addition, the extrusion process requires special machines to handle the sub-micron thick films and the addition of pigments or reflective fillers e.g. mica platelet could cause undesirable flow line defects.

Thus there is a need for articles with good reflective characteristics at relatively low cost. There is a need for an improved and cost effective process to prepare a thermoplastic article having a metallic appearance.

BRIEF DESCRIPTION

Disclosed herein are foamed polymer articles and methods for making the same.

In one embodiment, the method for making a polymer article comprises: orienting polymer chains in one direction more than any other direction to form an oriented article, contacting the oriented article with a foaming agent, and foaming the material to form the reflective polymer article comprising planar cell structures having a length "l" and a thickness "t".

In one embodiment, a reflective polymer article comprises: layers of polymer material comprising polymer chains oriented one direction more than any other direction; and layers of gas cells having a planar cell structure.

Various other features, aspects, and advantages of the present invention will become more apparent with reference to the following description, examples, and appended claims.

BRIEF DESCRIPTION OF THE DRAWINGS

Referring now to the figures, which are exemplary embodiments, and wherein the like elements are numbered alike.

DETAILED DESCRIPTION

Figure 1:
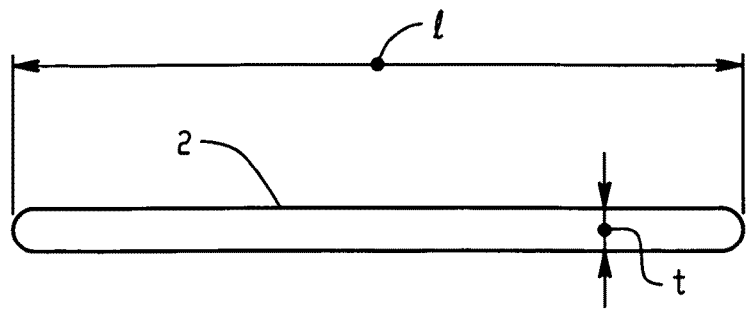
FIG. 1 is a cross-sectional view of an embodiment of a planar cell structure.

Polymer material can be any polymeric material for making polymer foam and articles therefrom. In various embodiments, the polymer contains a thermoplastic polymer, an amorphous polymer, a semi-crystalline polymer, a thermoset polymer, or a combination comprising at least one of the foregoing polymers.

Thermoplastic polymers that can be used are oligomers, polymers, ionomers, dendrimers, copolymers such as block copolymers, graft copolymers, star block copolymers, random copolymers, or the like, or combinations comprising at least one of the foregoing polymers. Examples of thermoplastic polymers include polyacetals, polyacrylics, polycarbonates polystyrenes, polyesters, polyamides, polyamideimides, polyarylates, polyarylsulfones, polyethersulfones, polysulfones, polyimides, polyetherimides, polytetrafluoroethylenes, polyetherketones, polyetheretherketones, polyetherketoneketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyureas, polyphosphazenes, polysilazanes, or the like, or combinations comprising at least one of the foregoing thermoplastic polymers.

In an embodiment, the thermoplastic polymer comprises an acrylic resin, a polycarbonate, a polyolefin, a polyester, or a polyvinyl chloride. In another embodiment, the thermoplastic polymer comprises a polyetherimide or a polycarbonate. Polyetherimides and polycarbonates can be prepared by methods known in the art. Polycarbonates are particularly useful since they have high toughness, excellent transparency, and good moldability. In a particular embodiment, polycarbonates prepared from bisphenol A, either as a monomer or a comonomer are useful polymers for producing foams and foamed articles due to their optical transparency and mechanical properties, e.g., impact properties (such as an impact strength). Thus, a polycarbonate foamed article having tough impact strength, super-insulation, and optical transparency can be produced using the techniques described herein. The polycarbonate resin for use is generally obtained from a dihydric phenol and a carbonate precursor by an interfacial polycondensation method or a melt polymerization method. Typical examples of the dihydric phenol include those disclosed in U.S. Patent Application Publication No. 2003/0207082 A1. In another embodiment, polycarbonates produced from 2,2-bis(4-hydroxyphenyl)alkanes and/or bisphenol A can be employed for producing the foams and foamed articles disclosed herein.

Figure 2:
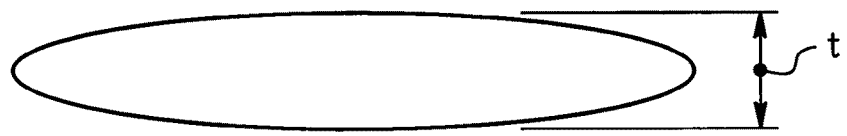
FIG. 2 is a cross-sectional view of an embodiment of an elliptical cell structure.
Figure 3:
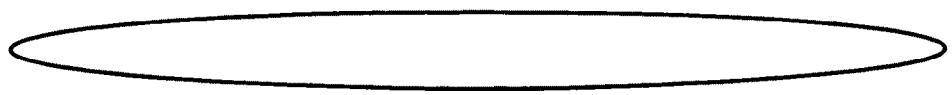
FIG. 3 is a cross-sectional view of an embodiment of the effect of stretching an elliptical cell structure, e.g., of stretching the elliptical cell of FIG. 2.

Non-limiting examples of semi-crystalline thermoplastic polymers include polybutylene terephthalate, polyphenylene sulfides, polyetheretherketones (PEEK), polyetherketones (PEK), polyphthalamides (PPA), polyetherketoneketones (PEKK), and high temperature nylons. Blends of thermoplastic polymers can also be used. Examples of blends of thermoplastic polymers include those materials disclosed in U.S. Patent Application Publication No. 2005/0112331 A1. In one embodiment, the thermoplastic polymers used herein can also contain thermosetting polymers. Examples of thermosetting polymers are polyurethanes, natural rubber, synthetic rubber, epoxy, phenolic, polyesters, polyamides, polyimides, silicones, and the like, and combinations comprising at least one of the foregoing. In one embodiment, the polymer substrate can be a sheet or film. The polymer material (i.e., the polymer chains) can be oriented in one direction or in multiple (e.g., different) directions. Molecular orientation of polymer chains has a considerable effect on the final properties of polymer products including, but not limited to, the stiffness, strength, impact strength, and creep resistance. Molecular orientation that occurs before foaming is capable of providing a planar cell structure. Essentially, in the stretched material, the polymer chains act to constrain the foaming agent and hence constrain the cells as the material is foamed, thereby forming a planar cell structure (i.e., cells having a flat surface as illustrated in FIG. 1). However, when the polymer is first foamed and subsequently oriented (e.g., stretched after the foaming process), a planar structure cannot be obtained. In this situation, the cells are not constrained by stretched (and hence stressed) polymer chains during the foaming process, so rounded cell structures are formed (as illustrated in FIG. 2). When the foamed material is subsequently stretched, the rounded cells are merely stretched. Hence, stretched rounded cell structures are formed (as illustrated in FIG. 3). This post stretching does not form a planar (i.e., flat) surface (e.g., such as element 2 in FIG. 1), but merely a stretched cell with a curved surface (see FIG. 3).

Not to be limited by theory, it is believed that by orienting the polymer chains (e.g., stretching a polymer material) in at least one direction and then contacting the polymer material with a foaming agent, the chains restrict the growth of the cells in the lateral direction (e.g., in their thickness (such as the "y" direction), such that expansion occurs in the longitudinal direction (e.g., within one plane; along the width (e.g., the "z" direction) and the length (e.g., the "x" direction)) such that a planar structure is realized. On the other hand, when the film is stretched after foaming, the rounded or circular cells are stretched (e.g., elongated), into a more elliptical structure. However, expansion in all three directions had already occurred. It does not appear that this post-stretching is capable of obtaining the planar structure obtained with pre-stretching and then foaming.

When gas cells are formed in an unoriented polymer, the cells have a natural tendency to grow into a spherical shape. A cell with a spherical shape will scatter electromagnetic radiation in all directions; e.g., any curvatures of the cell present in a circular, spherical, or elliptical shape will reduce reflection. A cell with a flat shape will reflect the electromagnetic radiation. Molecular orientation of the polymer chains before foaming orients the polymer and increases the stiffness of the polymer. The physically stretched polymer chains of the gas cell are difficult to expand, which allows the foam to form a planar platelet shape with a relatively large thickness to width or length ratio (as described previously) between the stretched and hence, stiff polymer chains. This results in a flat surface, which reflects more radiation than a curved surface (e.g., circular or elliptical shape). FIG. 1 illustrates a planar platelet shape. As disclosed herein, the term "foaming agent" also referred as "blowing agent" can be a chemical blowing agent or a physical blowing agent. The foaming agent can be a solid, a liquid, or a supercritical material. Blowing or foaming agents that can be used include inorganic agents, organic agents, and other chemical agents. Exemplary inorganic blowing agents include but are not limited to carbon dioxide, nitrogen, argon, water, air, and inert gases such as helium and argon. Organic agents include but are not limited to aliphatic hydrocarbons having 1 to 9 carbon atoms, aliphatic alcohols having 1 to 3 carbon atoms, and fully and partially halogenated aliphatic hydrocarbons having 1 to 4 carbon atoms. Non-limiting examples of aliphatic hydrocarbons include methane, ethane, propane, n-butane, isobutane, n-pentane, isopentane, neopentane, and the like. Non-limiting examples of aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane, and the like. Partially halogenated chlorocarbons and chlorofluorocarbons include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123), 1-chloro-1,2,2,2-tetrafluoroethane (HCFC-124), and the like. Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Other chemical agents include azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, trihydrazino triazine, and the like.

In one embodiment, the foaming agent can be selected from the group consisting of carbon dioxide, air, nitrogen, argon, gaseous hydrocarbons, and combinations comprising at least one of the foregoing. The foaming agent can be selected from the group consisting of solid carbon dioxide, liquid carbon dioxide, gaseous carbon dioxide, or supercritical carbon dioxide. Any of the inert gases, such as for example, helium, xenon, and argon can be used. Non-limiting examples of gaseous hydrocarbons include methane, ethane, propane, and butane. In another embodiment, halohydrocarbons that can be expected to be in a gaseous form at ambient temperature and pressure can be used. Non-limiting examples of such halohydrocarbons include fluorohydrocarbons, fluorocarbons, chlorocarbons, and chlorofluorocarbons. In one embodiment, the gas cells can be a gas bubble formation in the foam substrate, which can be generated during the foaming process in the presence of a physical or a chemical foaming agent.

In one embodiment, the pores of gas cells can be of any shape, for example, platelet, planar, or flakes, and can have a regular or irregular shape. In another embodiment, the aspect ratio (the thickness to lateral dimension ratio) of the pore is greater than 1. The foamed polymer can have an average pore thickness "t", that is chosen based upon the wavelength ($\lambda$) of light which is intended to be reflected. For example, the gas cell can have an average thickness "t" that is up to $10\lambda$, specifically, that is less than or equal to $\lambda$, more specifically, that is $0.001\lambda$ to $\lambda$, and yet more specifically, that is $0.25\lambda$ to $0.75\lambda$. In some embodiments, the gas cell can have an average thickness "t" that is $0.5\lambda$ to $\lambda$. In other words, the average thickness "t" can be equivalent to 0.25 times the particular wavelength (that is desired to be reflected) to 0.75 times the particular wavelength. For example, the gas cell can have an average thickness "t" that is greater than or equal to about 10 nanometers, e.g., for the reflection of visible light, an average thickness can be about 10 nanometers to about 500 nanometers, specifically, about 10 nanometers to about 200 nanometers, more specifically, about 10 nanometers to about 100 nanometers. For the reflection of near infrared light, for example, the gas cell can have an average thickness "t" of less than or equal to about 3,000 nanometers, specifically, about 100 nanometers to about 2,250 nanometers, more specifically, about 200 nanometers to about 2,000 nanometers, and yet more specifically, about 280 nanometers to about 1,000 nanometers.

In one embodiment, the pore of the gas cells can have a platelet structure where the cross-section of the gas cells is planar (e.g., the cell structure has a flat surface). For example, the cell structure can be flat across greater than or equal to 50% of a surface of the cell structure (e.g., see surface 2 in FIG. 1), specifically, greater than or equal to 75%, more specifically, greater than or equal to 85%. FIG. 1 illustrates a platelet structure, where the gas cells have a planar cell structure. For example, the platelet structure can have a length "l" that is greater than or equal to 3 times the thickness "t" of the platelet structure, specifically, greater than or equal to 5 times greater, more specifically, greater than or equal to 10 times greater, even more specifically, greater than or equal to 15 times greater, and still more specifically, greater than or equal to 20 times greater than the thickness "t".

In one embodiment, the foamed polymer can have a thickness of about 20 micrometers to about 50 micrometers. The thickness of the sheet can be 1 mm to about 100 mm, specifically, 1 mm to 32 mm, more specifically 3 mm to 16 mm. The thickness of the film can be 0.01 micrometers to 1,100 micrometers, specifically, 0.1 micrometers to 1,000 micrometers, more specifically 0.5 micrometers to 900 micrometers.

In one embodiment, one or more techniques can be used to increase the number of voids in the foamed polymer substrate per unit volume (also defined herein as 'cell density'), for example, to about a billion voids per cubic centimeter in the foamed polymer substrate. In one embodiment, a combination of physical blowing agent, a surface tension modifier, application of a pulsating pressure, and a temperature quench step can be used to create voids and establish cell density. In another embodiment, the extruder screw and the die can be designed in such a way so as to maximize the pressure drop in the extruder. In another embodiment, the increase in the cell density can be achieved by various other techniques known in the art. For example, polymer material can be saturated with a high concentration of the foaming agent, such as carbon dioxide, at a low temperature, such as below ambient temperature.

The polymer material for processing into cellular foams can also include one or more fire-retardant agents admixed therewith. Any suitable fire-retardant can be used. Other materials or additives, such as antioxidants, anti-drip agents, anti-ozonants, thermal stabilizers, anti-corrosion additives, impact modifiers, ultra violet (UV) absorbers, mold release agents, fillers, anti-static agents, flow promoters, impact modifiers, pigments, dyes, and the like, such as, for example, disclosed in U.S. Patent Application Publication No. 2005/0112331 A1, can be provided. In one embodiment, fillers that can help in the foaming process and/or help improve the properties, such as for example, dielectric properties, mechanical properties, and the like can be added.

Dyes or pigments can be used to color the article. Dyes are typically organic materials that are soluble in the resin matrix while pigments can be organic complexes or even inorganic compounds or complexes, which are typically insoluble in the resin matrix. These organic dyes and pigments include the following classes and examples: furnace carbon black, titanium oxide, zinc sulfide, phthalocyanine blues or greens, anthraquinone dyes, scarlet 3b Lake, azo compounds and acid azo pigments, quinacridones, chromophthalocyanine pyrrols, halogenated phthalocyanines, quinolines, heterocyclic dyes, perinone dyes, anthracenedione dyes, thioxanthene dyes, parazolone dyes, polymethine pigments and others.

Colorants such as pigments and/or dye additives can also be present. Exemplary pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.1 to about 20 parts by weight, based on 100 parts by weight of the polymer portion of the composition.

In one embodiment, the polymer material and foaming agent can be contacted in an extruder. Additives can also be fed into the extruder along with the polymer material and foaming agent. In one embodiment, the components can be contacted in a masterbatch. The polymer material, foaming agent and any additives together can also be referred to as feed material. In one embodiment, the feed material can be produced by melt blending. The melt blending can be carried out in a single step using any effective device, such as single and twin-screw extruders, Buss kneaders, roll mills, Waring blenders, Henschel mixers, helicones, Banbury mixers, or the like, or combinations of the at least one of the foregoing melt blending devices.

In one embodiment, the polymer material, foaming agent and any additives can be contacted at a temperature in a range from about −100° C. to about 400° C. to form a polymer material concentrated with a foaming agent comprising gas cells. In another embodiment, the contacting can be performed at a temperature in a range from about 0° C. to about 250° C. In yet another embodiment, the contacting can be performed at ambient temperature. In an embodiment, the contacting can be carried out at a temperature from about −100° C. to about 20° C. In another embodiment, the contacting can be carried out at a temperature from about −40° C. to about ambient temperature, and in still another embodiment, the contacting can be carried out at a temperature from about −40° C. to about 20° C. Higher temperatures, such as for example, the melting temperature of the polymer can also be used. In another embodiment, the contacting can be carried out at a temperature from about −40° C. to about melt temperature of the polymer substrate. In one embodiment, the contacting can be carried out at a pressure from 0.1 N/mm² to about 1,000 N/mm². In another embodiment, the contacting can be carried out at a pressure from 1 N/mm² to about 750 N/mm². In yet another embodiment, the contacting can be carried out at a pressure from 50 N/mm² to about 600 N/mm².

In one embodiment, foaming of saturated polymer material can be carried out by solid-state foaming, by chemical decomposition, or by a phase separation process. For example, in solid-state foaming, the foaming agent gas molecules can diffuse into the polymer at a very high saturation pressure to form a single phase (also sometimes referred to as the "homogeneous phase") of the "gas-polymer" portion of the polymer material. While doing so, a pressure quench can appear in the gas-polymer phase, which can lead to instability in the system and gas molecules can separate themselves from the polymer, which can result in nucleation and growth of gas bubbles.

In one embodiment, the polymer foams can be developed by (i) stretching the polymer sheet under uni-axial tension to form oriented multiple polymer layers; (ii) contacting the polymer sheet with the foaming agent at room temperature or elevated temperature under high pressure and adjusting a total time taken for forming the polymer and gas in "homogeneous phase"; and (iii) putting the homogeneous polymer and gas material at a temperature close to the Tg of the polymer material under compressive load followed by pressure and temperature quenching. In one embodiment, the quenching of the reflective polymer article can be carried out at a temperature from about 0° C. to about ambient temperature and a pressure from about 0.1 Newtons per square meter (N/mm²) to about 1,000 N/mm². In another embodiment, the quenching of the reflective polymer article can be carried out at a temperature from about 0° C. about 22° C. and a pressure from about 0.1 N/mm² to about 1,000 N/mm². In one embodiment, the foaming can further include a step of applying a force to create a plurality of gas cells. In another embodiment, the gas cells can have a platelet structure having a planar interface. In one embodiment, constraining the polymer material can restrict the growth of the foam in one direction. In another embodiment, the foaming can restrict the growth of the foam in more than one direction, e.g., by multidirectional stretching of the article prior to foaming. In one embodiment, restriction of foam growth in one direction can be in the direction of the thickness of the article. In another embodiment, the restriction of foam growth can be about 1% to about 10% of the thickness.

In one embodiment, stretching can create a multilayered material with at least two layers. Stretching can be achieved by pulling the polymer sheet in uni-axial, bi-axial, or multi-axial directions. In another embodiment, stretching orientation can create platelets or a lamellar or planar structure in the oriented material.

In one embodiment, stretched carbon dioxide ($CO_2$) saturated polymer material can be subjected to depressurization. In another embodiment, the depressurized polymer material can be heated to a temperature near the glass transition temperature (Tg) of the polymer material. The heating can also be carried out under compressive load. On heating the polymer material under a compressive load, the $CO_2$ in the polymer material can grow in-between the polymer material layers and separate them leaving a void between the layers to give a foamed polymer material. In one embodiment, the unrestrained growth of the $CO_2$ in the polymer material can be two dimensional (in other words, growth in the third dimension is restrained, and therefore comparatively small).

In one embodiment, the method of making a reflective polymer article described above can be implemented in a batch, semi-batch, or a continuous process. In one embodiment, the polymer material and the additives can also be coextruded. In another embodiment, the method of making a reflective polymer article is a continuous process. In another embodiment, the process can allow production of polymer foams having a relatively uniform and a narrow pore size distribution, wherein the pore size distribution is less than or equal to about one time the standard deviation of the average pore size. In yet another embodiment, the process can be carried out using an extruder and injection molding machines For example, the reflective polymer substrate can be prepared using a sheet extruder at a temperature of about 145° C. The extrusion can then be followed by biaxial stretching under a strain of about 100% to form a stretched polymer substrate. The stretched polymer substrate can then be saturated with carbon dioxide at a temperature of about 22° C. A shaping die or calibrator can be employed during the foaming stage for anisotropic foaming that can result during formation of the reflective polymer substrate.

In one embodiment, the reflective polymer article can contain a plurality of layers having gas cells with polymer/gas/polymer interfaces. For example, if the polymer material is represented as A and the gas cell is represented as B, the layers can be arranged alternately like ABABABAB. In another embodiment, the reflective polymer article can be independent of the layer arrangement and other sequences of layer arrangements.

Figure 4:
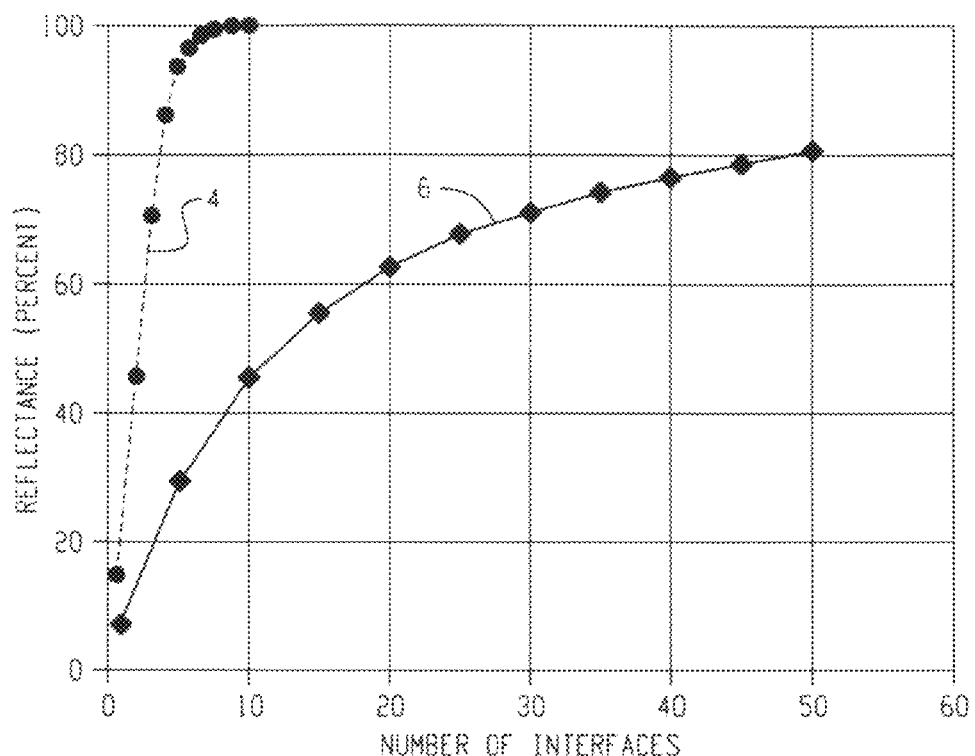
FIG. 4 is a graphical representation of computational experiments illustrating the differences in reflectance between the planar cell structure of FIG. 1 and the elliptical cell structure of FIG. 2.
Figure 5:
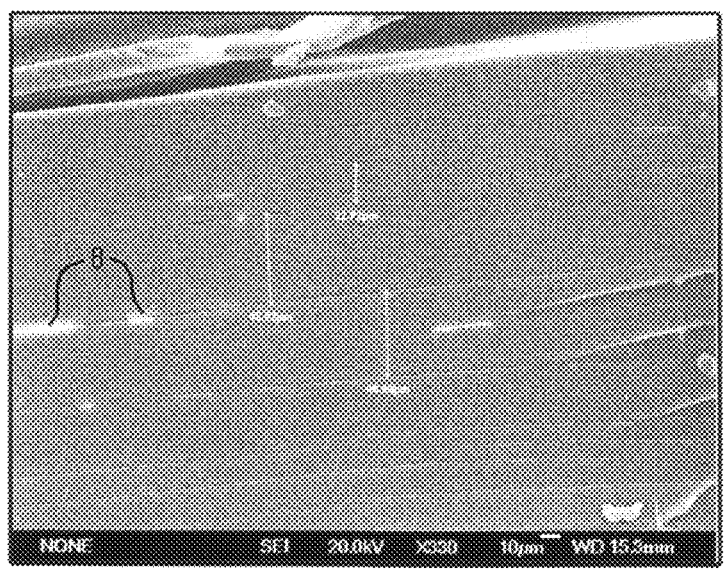
FIG. 5 is a micrograph of a cross-sectional view of a foamed polymer sheet wherein the gas cells comprise the planar cell structure discussed herein.

If the reflections of multiple thin surfaces can be arranged by the foaming process so that their phases interfere constructively at the top surface, a total reflectivity of close to one can be achieved with less than or equal to 10 layers or platelets. (see FIG. 4). In one embodiment a reflectance of about 1.0 (i.e., 100% reflectance) can be achieved with a number of layers of less than or equal to 15, specifically less than or equal to 12, more specifically, less than or equal to 10, even more specifically less than or equal to 7. In still another embodiment, to achieve a reflectance of about 0.95, the number of layers is less than or equal 8, more specifically, less than or equal to 7. In yet another embodiment, to achieve a reflectance of about 0.97, the number of layers is less than or equal to 9, specifically, less than or equal to 8. In another embodiment, to achieve a reflectance of about 0.9, the number of layers is less than or equal to 7, more specifically, less than or equal to 6. As can be seen from the computational experiments illustrated in FIG. 4, a film comprising the planar cell structure attains a reflectance of greater than 90% in less than 10 layers (i.e., alternating layers of polymer material and gas cells as described above). A film having elliptical cell structures, however, does not attain a reflectance of greater than 80%, even with 50 layers.

In one embodiment, adjacent layers of gas cells and polymer material differ from each other in refractive index by greater than or equal to about 0.05, specifically, about 0.05 to about 5, or more specifically, about 0.5 to about 1. In one embodiment, the reflective polymer article having a metallic color can be obtained by stretching a plastic material such that more of the polymer chains of the plastic material are oriented in one direction. In another embodiment, there can be a difference in the refractive index of the polymer material layer and the void that can be present in the foamed polymer material.

In one embodiment, the reflective polymer article can reflect at least about 60 percent of the electromagnetic spectrum incident on the surface of the article. The term "electromagnetic spectrum" can be defined as the full frequency range of electromagnetic radiation, and contains radio waves, microwaves, infrared, ultra violet, visible, and x-rays. In another embodiment, the reflective polymer article can reflect in a range from about 60 percent to about 90 percent of the electromagnetic spectrum incident on the surface. In one embodiment, the reflective polymer article reflects at least 70 percent of light at a wavelength within the visible and infrared range. In another embodiment, the reflective polymer article reflects at least 70 percent of light at a wavelength in the infrared range, or reflects at least 70 percent of light at a wavelength in the visible range. In one embodiment, the reflective polymer article can reflect at least about 60 percent of the electromagnetic spectrum incident on the surface of the article due to the presence of a plurality of layers having gas cells with polymer/gas/polymer interfaces that can differ from each other in refractive index by at least about 0.05.

In one embodiment, the reflective polymer article can reflect the electromagnetic spectrum so as to provide a metallic appearance, for example, a silvery appearance. A metallic appearance can be defined by greater than about 60% of reflected light, which can reach the observer. Also, the reflected light can show angle dependent changes in the reflection, which can produce a color shift appearance. A silver metallic appearance can be defined as a color, which can show greater than about 60% of reflected light across the visible spectrum, from 380 nm to 780 nm. In another embodiment, the reflective polymer article can be made of multiple layers providing an article having varied colors or hues. In general, if the reflected spectrum shows a relatively higher reflection of greater than about 60% in a particular wavelength range, then this can be displayed as a color of that wavelength. For example, a peak reflection around 400 nm shows a blue color. Similarly a peak reflection around 550 nm shows a green color.

The reflective polymer article can be used for producing a variety of applications. In one embodiment, the article can be a flowline free extruded article with a metallic effect. In another embodiment, the article can be an injection molded article with a metallic effect. In one embodiment, the reflective polymer article can be used for producing sheets or panels, some examples of which include an integrated sandwich panel, a co-laminated panel, a co-extruded panel comprising an inner sheet, graded sheets, co-extruded sheets, corrugated sheets, multi-wall sheets, an integral sheet structure comprising a sheet of reflective polymer article and a reinforced skin as a top layer, and a multi-wall sheet structure comprising at least one reflective polymer article sheet disposed between two or more plastic sheets. The reflective polymer article can also comprise an energy absorbing material, a packaging material, a thermal insulation material, an acoustic insulation material, a building construction material, or a building glazing material. Some specific application areas for super-insulating foam include for example, buildings, refrigerators and refrigeration systems, heaters and heating systems, ventilation systems, air conditioners, ducting systems for transporting hot or cold materials, such as for example liquids, air, and other gases, and cold rooms. Super-insulation foamed structures containing the reflective polymer substrate can also be used for making high temperature turbine parts, such as, for example, turbine blades. Super-structural and super-insulation foamed structures containing the reflective polymer article can be used in building and construction panels, including opaque super-insulating sandwich panels. Some examples of applications of the reflective polymer article as a material having both super-structural properties and transparency include roof glazings, building glazings, construction glazings, and automotive glazing. In another embodiment, panels or sheets comprising the reflective polymer article can include an airplane or an automobile outer structural component, a roof, a greenhouse roof, a stadium roof, a building roof, a window, a skylight, or a vehicular roof.

In another embodiment, various articles sensitive to ultraviolet radiation are readily protected by over-wrapping in an ultraviolet reflecting film as disclosed herein which is transparent to visible light. Meats (both fresh and processed), nuts, cheese and like comestibles which are altered by exposure to excessive amounts of ultraviolet radiation are protected and yet are readily visible for inspection.

There are many applications where films having strong reflection in the infrared can be useful, for example, in an air-conditioned building or vehicle such as glazing, it can be useful to laminate a reflective polymer article to another material, such as conventional window glass to provide mechanical strength and oftentimes scratch resistance and/or chemical resistance. Infrared reflective polymer article can also be incorporated within the plastic layer of conventional safety glass.

Reflective polymeric articles of this invention can have a wide variety of potentially useful applications. For example, articles can be post formed into concave, convex, parabolic, half-silvered, etc. mirrors. The mirror-like appearance can be accomplished by coextruding a black or otherwise light absorbing layer on one side of the body. Alternatively, one side of the final body can be coated with a colored paint or pigment to provide a highly reflective mirror-like body. Such mirrors may not be subject to breakage as would glass mirrors.

The reflective polymer article can also be used in birefringent polarization. Through proper selection of the polymer materials making up the layers, a refractive index differential in one plane of the polarizer can be achieved. In a preferred method, the refractive index differential can be created after fabrication of the reflective polymer article. The polymer materials can be selected so that the first material has a positive stress optical coefficient and the second polymer material has a negative stress optical coefficient. Stretching the material containing the two polymer materials in a uni-axial direction can cause them to orient and can result in a refractive index differential in the plane of orientation to produce a polarizer.

Molecular orientation can be achieved by tensile drawing of the polymer material, (e.g., in the form of sheet, film, etc.) at below the glass transition temperature ($T_g$) of the polymer material. For example, molecular orientation of amorphous polymers by solid state drawing can be carried out at temperatures 5° C. to 20° C. below their $T_g$ of the polymer. The specimen can be drawn to a draw ratio of greater than or equal to about 1.5, specifically, greater than or equal to 2. In other words, the specimen can be drawn to a length that is greater than or equal to about 1.5 times the original length before the drawing. The polymer is then cooled (actively and/or passively) and removed from the machine. The physically stretched sample can be saturated with a blowing agent to form a homogenous mix of the polymer and the blowing agent.

When the blowing agent nucleates and grows into a bubble. The natural tendency of a bubble is to grow into a spherical shape. A spherical shape will scatter electromagnetic radiation in all directions. However, if the bubble surface is flat, then it will reflect the electromagnetic radiation. Any curvature of the bubble will reduce the reflection. The physical stretching before the saturation orients the polymer and increases the stiffness of the polymer. The physically stretched polymers on the top and bottom of the bubble during foaming are relatively hard to expand and hence the foam forms a platelet shape with extremely large thickness to width or length ratio, between the stretch and stiff polymer chains. This provides a substantially flat surface, which helps to reflect significantly more radiation than would a curved surface.

Desirably, the stretched, foamed article (e.g., sheet, film, etc.) has a reflectivity of greater than 80% at wavelengths of 280 nm to 1,200 nm, specifically, greater than 85%, more specifically, greater than 90%, and yet more specifically, greater than or equal to 95%.

Additionally, the highly reflective polymer article can be fabricated as non-corroding metallic appearing articles for indoor or outdoor exposure. For example, the reflective polymer article can be fabricated into signs or bright work for appliances. The reflective polymer article can be post formed into highly reflective parts such as automotive head lamp reflectors, bezels, hub caps, radio knobs, automotive trim, or the like, or by processes such as thermoforming, vacuum forming, shaping, rolling, or pressure forming. The reflective polymer article can also be formed into silvery or metallic appearing bathroom or kitchen fixtures, which do not corrode or flake.

In one embodiment, the reflective polymer article can be formed by coextruding into different shapes, for example, films, sheets, channels, lenticular cross-sections, round tubes, elliptical tubes, or parisons. For example, decorative moldings such as wall moldings and picture frame moldings, automotive trim, home siding, silvery appearing bottles and containers and the like can be readily coextruded through forming dies. The reflective polymer article can also be employed into a wide variety of articles such as two-way mirrors, infrared reflectors for insulation, solar intensifiers to concentrate solar radiation, dinnerware, tableware, containers, microwavable articles, and packages.

In one embodiment, the reflective polymer article can be more readily understood, reference is made to the following examples, which are intended to be illustrative of the invention, but are not intended to be limiting in scope.

EXAMPLES

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. The following examples are intended only to illustrate methods and embodiments in accordance with the invention, and as such should not be construed as imposing limitations upon the claims.

Example 1

A sheet of polycarbonate (LEXAN® resin from SABIC Innovative Plastics) (10×50×3 mm) was processed to attain molecular orientation. Molecular orientation was achieved by tensile drawing of injection molded dumb-bell shaped specimens and sheets of the polycarbonate below the glass transition temperature ($T_g$). The $T_g$ of polycarbonate measured by dynamic mechanical analysis was found to be around 150° C. Two different draw temperatures, 130° C. and 145° C., were therefore chosen to study the effect of draw temperature on the properties of drawn polycarbonate. The solid state drawing of the dumb-bell shaped specimens was carried out on a Zwick Z020 universal testing machine fitted with an oven for temperature control. The gauge length for drawing was set at 80 mm. Two different cross head speeds, 5 millimeters per minute (mm/min) and 10 mm/min, translating into strain rates of 0.001 seconds $(s)^{-1}$ and 0.002 $s^{-1}$, were used to study the effect of strain rate. The specimens were drawn to a draw ratio of approximately 2 (final gauge length of 160 mm), cooled, and then removed from the machine.

The stretched sample was treated with carbon dioxide gas at around 25° C. and a pressure of about 60 bar for a period of about five days in a pressure vessel. The concentration of carbon dioxide in the polycarbonate was measured to increase to about 10.5 percent after removing from the pressure vessel (with an operating pressure range of about 100 bar, diameter of about 60 mm, and a depth of about 120 mm, with a provision for a gas inlet and an outlet with a pressure indicator and a temperature sensor) by using a weighing balance.

On a set of 6 samples, 3 were used for weight gain measurement and 3 for foaming experiments, respectively. The treated polycarbonate sheet was then depressurized by releasing the pressure release valve. The sample was removed from the pressure vessel and subjected to a temperature of about 140° C., by immersing in a hot liquid container for about 15 minutes. The sheets were clamped to a fixture throughout the foaming process. In other words, the sheets were constrained between plates to a distance of about 4 mm. In constrained foaming, the thickness increased and was constrained such that the final sheets had a thickness of less than about 4 mm. The foamed sheet with fixture was immersed in a water bath for about 5 minutes to cool and stabilize the foamed sample. For the unconstrained, stretched sheets, 3 mm thick solid sheet increased in thickness to about 6 mm during the foaming process. Unstretched, unconstrained sheets increased in thickness to greater than 6 mm.

Figure 6:
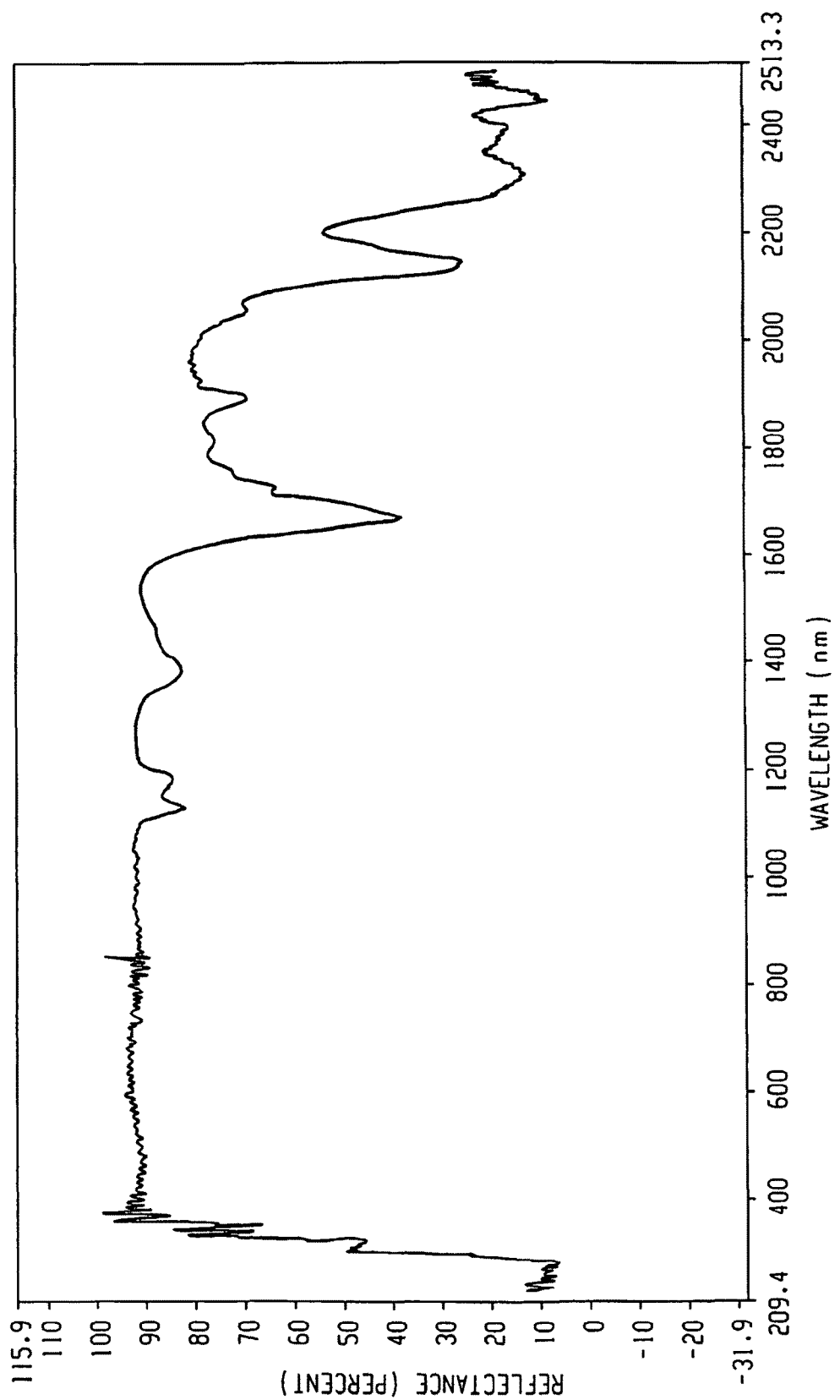
FIG. 6 is a graphical representation of percent reflectance versus wavelength for an embodiment of a polymer sheet comprising the planar cell structure.

FIG. 6 is a graphical illustration of the reflectivity of the pre-stretched, foamed, constrained sheet having the planar cell structure. As can be seen from the figure, a percent reflectance of about 90% was attained at wavelengths of about 400 nm to about 1,500 nm, and even at many wavelengths up to about 1,500 nm.

Example 2

Example 2 was prepared using the procedure in Example 1 with polyetherimide (ULTEM® resin from SABIC Innovative Plastics) instead of polycarbonate and a temperature at which the treated sheet of polyetherimide was heated at about 225° C. The resultant sheet had a silvery/metallic appearance, thereby confirming that the process is effective with materials having a high glass transition temperature ($T_g$).

Example 3

Red colored Lexan sheets were prepared using the procedure in Example 1 with the addition of Lumogen F Red 305 (Manufacturer BASF). Based on ASTM D1003-00, procedure B measured with instrument Macbeth 7000A, D65 illuminant, 10° observer, CIE (Commission Internationale de L'Eclairage) (1931), and SCI (specular component included), and UVEXC (i.e., the UV component is excluded), 90% of the incident light was reflected in the visible region as measured using a spectrophotometer. This sheet had about 11 layers.

Example 4

Polycarbonate sheet was uniaxially drawn through a tapered die and tensile bars were drawn using an Instron Tensile Testing machine at about 145° C. with draw ratio of around 2. The polycarbonate sheet then underwent the foaming process as described above for Example 1. The reflectivity of the article having 9 layers or platelets was measured using ASTM D-1003-00 as in Example 3, indicating 80% of the incident light was reflected in the visible region.

Examples 5 and 6

These examples are numerical, computational experiments using polycarbonate having a refractive index of 1.5. The refractive index (RI) of platelets or layers is 1.0. As can be seen from FIG. 4, line 4 illustrates that the films or platelets described herein having a planar cell structure as illustrated in FIG. 1 can achieve reflectance values of 100% or close to 100 with less than or equal to 10 layers. Without the planar cell structure (i.e., with an elliptical gas cell structure as illustrated in FIG. 2, or thick layers wherein the thickness of the layer is greater than the wavelength of the light to be reflected), at least 50 layers were needed to achieve reflectance of only 0.8 (see line 6). Line 6 further shows that, having the elliptical cell structure, with 10 layers, a reflectance of only about 0.4 was achieved.

The singular forms "a", "an" and "the" include plural referents unless the context clearly dictates otherwise. The terms "front", "back", "bottom", and/or "top" are used herein, unless otherwise noted, merely for convenience of description, and are not limited to any one position or spatial orientation. Unless defined otherwise, technical and scientific terms used herein have the same meaning as is commonly understood by one of skill in the art to which this invention belongs. The modifier "about" used in connection with a quantity is inclusive of the stated value and has the meaning dictated by the context (e.g., includes the degree of error associated with measurement of the particular quantity).

"Optional" or "optionally" means that the subsequently described event or circumstance may or may not occur, and that the description includes instances where the event occurs and instances where it does not.

The term "polycarbonate" refers to polycarbonates incorporating structural units derived from one or more dihydroxy aromatic compounds and includes copolycarbonates and polyester carbonates.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable optional: (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The suffix "(s)" as used herein is intended to include both the singular and the plural of the term that it modifies, thereby including one or more of that term (e.g., the colorant(s) includes one or more colorants). As used herein, "combination" is inclusive of blends, mixtures, alloys, reaction products, and the like. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention.

The invention claimed is:

1. A method of making a reflective polymer article comprising:
    orienting polymer chains in one direction more than any other direction, to form an oriented article;
    contacting the oriented article with a foaming agent; and
    foaming the material to form the reflective polymer article comprising planar cell structures having a length "l" and a thickness "t".

2. The method of claim 1, wherein the length "l" is greater than or equal to 10 times the thickness "t".

3. The method of claim 1, wherein the polymer chains are selected from the group consisting of polyetherimide chains, polycarbonate chains, and combinations comprising at least one of the foregoing polymer chains.

4. The method of claim 1, wherein orienting the polymer chains comprises stretching a polymer material in one direction more than the polymer material is stretched in another direction.

5. The method of claim 4, wherein the polymer material is stretched under uni-axial tension.

6. The method of claim 1, wherein the reflective polymer article is designed to reflect a particular wavelength of light, and wherein the average thickness "t" is less than or equal to the particular wavelength.

7. The method of claim 6, wherein the average thickness "t" is equivalent to 0.25 times the particular wavelength to 0.75 times the particular wavelength.

8. The method of claim 1, wherein the reflective polymer article comprises less than or equal to 10 layers of the polymer material.

9. The method of claim 1, further comprising placing the oriented article between plates and constraining the oriented article during the foaming of the material.

10. A reflective polymer article formed by the method comprising:
    orienting polymer chains in one direction more than any other direction to form an oriented article;
    contacting the oriented article with a foaming agent; and
    foaming the material to form the reflective polymer article comprising planar cell structures having a length "l" and a thickness "t".

11. The article of claim 10, wherein the reflective polymer article is designed to reflect a particular wavelength of light, and wherein the average thickness "t" is less than or equal to the particular wavelength.

12. A reflective polymer article comprising:
   layers of polymer material comprising polymer chains oriented one direction more than any other direction; and
   layers of gas cells having a planar cell structure.

13. The article of claim 12, wherein the reflective polymer article is designed to reflect a particular wavelength of light, and wherein an average thickness "t" is less than or equal to the particular wavelength.

14. The article of claim 12, comprising a total number of layers of less than or equal to 15 including both layers of polymer material and layers of gas cells, and has a reflectivity of greater than 80% at wavelengths of 280 nm to 1,200 nm.

15. The method of claim 1, wherein orienting the polymer chains comprises stretching a polymer material at a temperature less than the glass transition temperature of the polymer material.

16. The method of claim 15, wherein stretching the polymer material occurs at a temperature 5° C. to 20° C. less than the glass transition temperature of the polymer material.

17. The method of claim 1, wherein foaming the material occurs at a temperature less than the glass transition temperature of the polymer material.

18. The method of claim 1, wherein the average thickness "t" is 100 nanometers to 2,000 nanometers.

19. The article of claim 10, wherein orienting the polymer chains comprises stretching a polymer material at a temperature less than the glass transition temperature of the polymer material and wherein foaming the material occurs at a temperature less than the glass transition temperature of the polymer material.

20. The article of claim 12, wherein foaming the material occurs at a temperature less than the glass transition temperature of the polymer material.

* * * * *